(12) United States Patent
Dobart et al.

(10) Patent No.: US 8,516,027 B2
(45) Date of Patent: Aug. 20, 2013

(54) METHOD AND SYSTEM FOR BIT STACKED FAST FOURIER TRANSFORM

(75) Inventors: Kristen L. Dobart, Cicero, NY (US); Michael T. Addario, Clay, NY (US)

(73) Assignee: SRC, Inc., North Syracuse, NY (US)

( * ) Notice: Subject to any disclaimer, the term of this patent is extended or adjusted under 35 U.S.C. 154(b) by 661 days.

(21) Appl. No.: 12/771,278

(22) Filed: Apr. 30, 2010

(65) Prior Publication Data
US 2011/0270901 A1 Nov. 3, 2011

(51) Int. Cl.
*G06F 17/14* (2006.01)

(52) U.S. Cl.
USPC ............................................. 708/404

(58) Field of Classification Search
USPC .......................................... 708/404, 603, 607
See application file for complete search history.

(56) References Cited

U.S. PATENT DOCUMENTS

| | | | |
|---|---|---|---|
| 4,298,950 A | 11/1981 | Smith, Jr. | |
| 4,791,590 A | 12/1988 | Ku et al. | |
| 5,093,801 A | 3/1992 | White et al. | |
| 5,179,529 A | 1/1993 | Nowakowski | |
| 5,717,620 A | 2/1998 | Williams | |
| 5,991,787 A | 11/1999 | Abel et al. | |
| 6,006,245 A | 12/1999 | Thayer | |
| 6,081,821 A | 6/2000 | Hopkinson et al. | |
| 6,317,770 B1 | 11/2001 | Lim et al. | |
| 6,411,978 B1 | 6/2002 | Naveh et al. | |
| 6,434,583 B1 | 8/2002 | Dapper et al. | |
| 6,530,014 B2 * | 3/2003 | Alidina et al. | 712/221 |
| 6,895,421 B1 * | 5/2005 | Dor et al. | 708/400 |
| 6,999,520 B2 | 2/2006 | Reina | |
| 8,051,123 B1 * | 11/2011 | Oberman et al. | 708/501 |
| 2002/0161813 A1 * | 10/2002 | Chiueh et al. | 708/622 |
| 2003/0212722 A1 | 11/2003 | Jain et al. | |
| 2003/0236806 A1 | 12/2003 | Hou | |
| 2005/0071403 A1 | 3/2005 | Taunton | |
| 2006/0248135 A1 | 11/2006 | Cousineau et al. | |
| 2008/0155003 A1 | 6/2008 | Lai et al. | |
| 2009/0049112 A1 | 2/2009 | Mugler et al. | |

FOREIGN PATENT DOCUMENTS
EP 0478128 4/1992

OTHER PUBLICATIONS

Yu-Heng George Lee: "Dynamic Kernel Function for High-Speed Real-Time Fast Fourier Transform Processors", PhD Thesis, Electgrical Engineering, Wright State University, 2009, XP55021530, URL: http://etd.ohiolink.edu/send-pdf.cgi/Lee YuHeng George.pdf?wright1260821902, Sections 4.1 and 4.2.

(Continued)

*Primary Examiner* — Chuong D Ngo
(74) *Attorney, Agent, or Firm* — George R. McGuire; Blaine T. Bettinger; Bond Schoeneck & King

(57) ABSTRACT

An FFT algorithm that splits a large bit width waveform into two parts, making it possible to conduct the FFT with much lower logic resource consumption is disclosed. The waveform is split into its most significant bits and its least significant bits through division in the form of a bit shift. Each partial signal is then put through an FFT algorithm. The MSB FFT output is then right bit shifted. The two partial FFT's are summed to create a single output that is largely equivalent to an FFT of the original waveform. Rounding distortion is reduced by overlapping the MSB and LSB partial signals.

12 Claims, 3 Drawing Sheets

(56) References Cited

OTHER PUBLICATIONS

Ling HE et al: "Specialising for High Performance FFT Algorithms Based on Fixed-Point DSP", 2006 International Conference on Communications, Circuits and Systems: Guilin, Guangxi,China, Jun. 25-28, 2006, IEEE Service Center, Piscataway, NJ, Jun. 1, 2006, pp. 563-566, XP031010494, ISBN: 978-0-7803-9584-8 Section III.
Johnson, et al., A modified split-radix FFT with fewer arithmetic operations, IEEE Trans.Signal Processing 55(1), 111-119, 2007.
Demuth, Algorithms for Defining Mixed Radix FFT Flow Graphs, IEEE Transactions on Acoustics, Speech and Signal Processing, V. 37, No. 9, Sep. 1989.
Ghassemi, et al., Finite Wordlength Design for FFT/IFFT in UWB-OFDM Systems, 1-4244-0697-8/07/.00 2007 IEEE.
Kabal, et al., Performance of Fixed-Point FFT's: Rounding and Scaling Considerations, ICASSP 86, Tokyo IEEE.
Jacobson, et al., The Design of a Reconfigurable Continuous-Flow Mixed-Radix FFT Processor, UC Davis.
Xilinx Fast Fourier Transform v7.0, DS260 Jun. 24, 2009 Product Specification, www.xilinx.com.

* cited by examiner

METHOD AND SYSTEM FOR BIT STACKED FAST FOURIER TRANSFORM

BACKGROUND OF THE INVENTION

1. Field of the Invention

The present invention relates to fast Fourier transform, and, more particularly, to a method and system for fast Fourier transform that reduces the required amount of logic resources.

2. Description of the Related Art

Historically, fast Fourier transform ("FFT") has been used to transform time domain data into frequency domain data and vice versa. FFT algorithms have a host of useful applications. For example, FFT can be used to convert sonar data detected in real-time into the frequency domain, where any dominant frequencies radiated by a sonar contact can be readily observed; this would be impossible looking at the time domain data alone. Frequency domain data is also useful for other sensor signal processing such as radar, as well as in the fields of communications, image processing, voice recognition, among many others.

The drawback to the use of FFT processing is that it can be very computationally expensive. Even though current FFT represents approximately a 100-to-1 reduction in required computation power compared to older discrete Fourier transform ("DFT") algorithms, typical signal processing FFT applications typically require tens of millions of computations per second, thereby requiring a significant computational load. This computational load increases dramatically with large bit depth data streams, and in some cases can outstrip available logic resources.

As a result of the heavy drain on computation resources produced by the use of FFT, there have been many attempts to reduce the amount of required processor resources. Some of these efforts have been directed towards reducing the number of computations required in the underlying mathematical operations themselves. Other efforts have involved various ways of rearranging the computation resources so as to split the data and "cascade" the required computations, or other techniques. None of these prior art techniques, however, have solved the problem of effectively computing FFT for very large bit depth data.

BRIEF SUMMARY OF THE INVENTION

It is therefore a principal object and advantage of the present invention to provide a method and system of fast Fourier transform that significantly reduces the computational load required for processing large bit depth signals.

It is another object and advantage of the present invention to provide a method and system for computing FFT by splitting the waveform into its most significant bits ("MSB") and its least significant bits ("LSB") in the form of a bit shift.

It is yet another object and advantage of the present invention to provide a method and system for computing FFT that reduces the distortion normally associated with divisional FFT by overlapping the MSB and LSB segments.

Other objects and advantages of the present invention will in part be obvious, and in part appear hereinafter.

In accordance with the foregoing objects and advantages, the present invention provides a method for computing FFT by splitting the waveform into its MSB and its LSB through division, in the form of a bit shift. Then, each of these parts are put through the FFT algorithm as if it were the waveform itself. The MSB output is then right bit-shifted since it was left bit-shifted originally to cause the division. The two partial FFT's are then summed, which is equal to the FFT of the original waveform.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

An FFT is essentially an algorithm for computing the discrete Fourier transform ("DFT")—and its inverse—of data samples. The DFT of a sequence x(n), n=0, ..., N−1 is defined as:

$$X_k = \sum_{n=0}^{N-1} x_n e^{-i 2\pi k \frac{n}{N}}$$

$$k = 0, \ldots, N-1$$

where k is an integer ranging from 0 to N−1 and N is the transform size.

Many different FFT algorithms have been developed. The Cooley-Tukey FFT algorithm, for example, is named after J. W. Cooley and John Tukey and is one example of a computationally efficient method for calculating the DFT. Under the Cooley-Tukey FFT algorithm, a DFT is expressed in terms of smaller DFTs, thereby reducing both the computation time and computation requirement.

Figure 1:
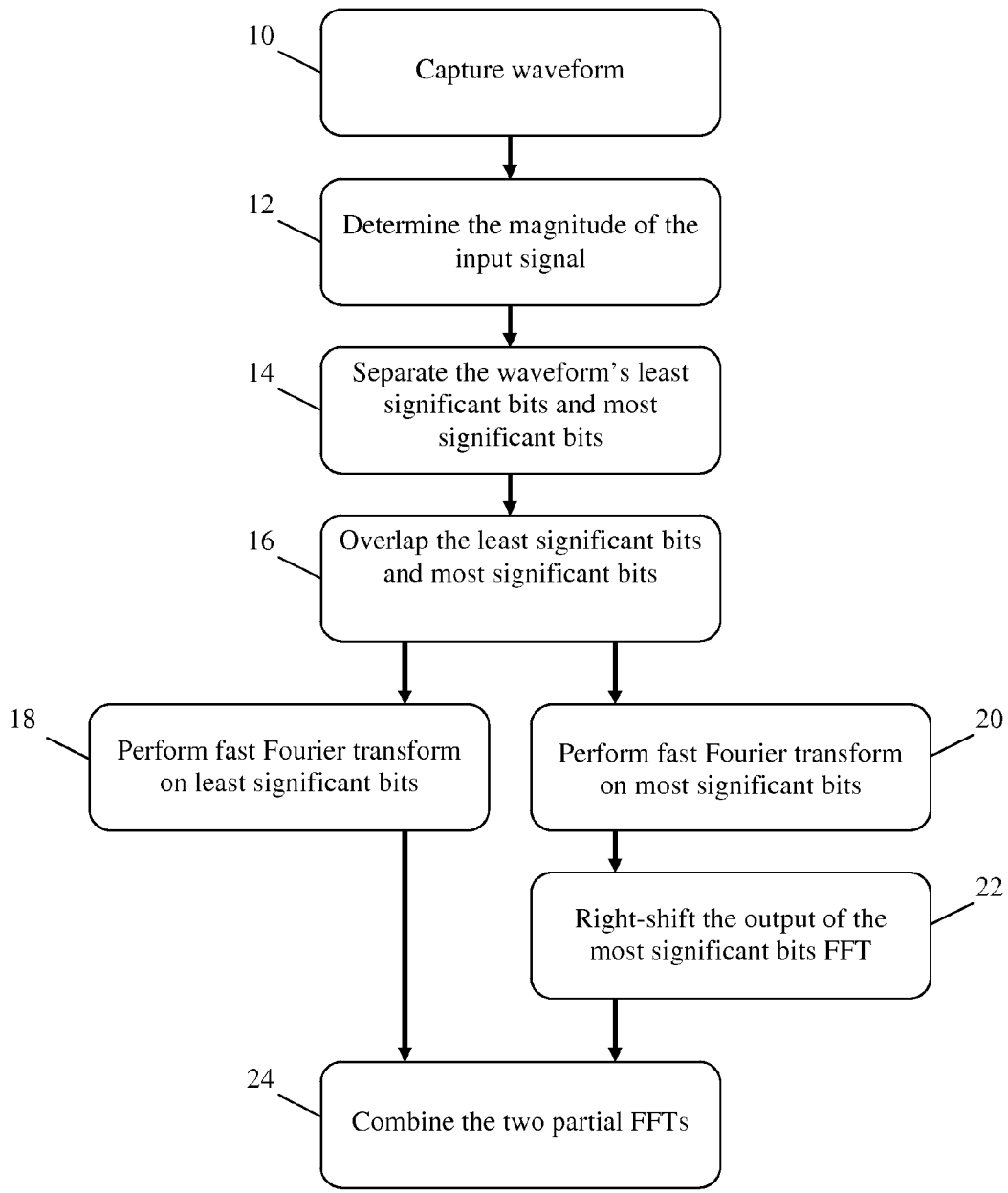
FIG. 1 is a schematic representation of an embodiment of the fast Fourier transform method according to the present invention.

Referring now to the drawings, wherein like reference numerals refer to like parts throughout, there is shown in FIG. 1 a schematic representation of the fast Fourier transform method according to one embodiment of the present invention. As an initial step 10, a waveform is captured for signal processing. The waveform can be any man-made, artificial, or natural electromagnetic signal capable of being detected. In a preferred embodiment, a system such as radar or sonar samples discrete data points of the waveform to translate it into the frequency domain using DFT. An analog-to-digital ("AD") converter, for example, can capture these data points at some pre-programmed or user-defined rate for downstream processing.

In step 12, the system determines the magnitude of the input signal in order to prevent distortion. If the input signal only toggles a couple of bits in the MSB FFT, there can be a large distortion in the output caused by rounding errors The larger in amplitude the input into a single FFT is, the smaller the distortion due to rounding. In a preferred embodiment, the method performs two different sized FFTs for the MSBs and the LSBs. The goal of step 12 is to determine the input strength and to split the input into LSBs and MSBs such that the MSB is not a small number. To accomplish this, the strength of the input signal is detected and if it is determined to be in the edge case such that the MSB would be a small number, the number of bits used in the LSB and the MSB is changed such that it is no longer in the edge case. This will prevent large rounding errors in the MSB FFT, which would result in large rounding errors in the output. In a preferred embodiment, the data entering the system is block float complex data, which has an I data, Q data and an exponent. The first thing that is examined to determine the magnitude of the input signal is the exponent. The system then examines the magnitude of the I/Q data. For positive numbers this is accomplished by looking for the first non zero bit. For negative numbers, this is accomplished by looking for the first zero. When the system knows the exponent and the magnitude of the I/Q data, the magnitude of the input signal can be determined.

A small number for the MSB is any number where the effects of rounding at each butterfly will significantly distort the output. The larger the input into the MSB FFT, the smaller the distortion of the output. The amount of rounding at each butterfly stage will also affect what would be considered a small number for the MSB. The more rounding in the FFT, the larger the input into the MSB FFT should be. For example, if the data input was split such that the MSB ranged from −4 to 3 while the LSB ranged from −534,288 to 524,287, the rounding errors from the MSB FFT would be a significant segment of the MSB FFT output and would thereby cause large spurs or distortions in the output. However, if the split between the MSB and LSB were changes such that the MSB ranged from −2048 to 2047 and the LSB ranged from −1024 to 1023, the rounding errors would be significantly reduced.

Since FFT is a linear operation, different sections of any waveform can be FFTed separately and then combined to produce the same output as if the wave was FFTed as a whole. In step 14, the waveform's least significant bits ("LSB") and most significant bits ("MSB") are separated through division in the form of a bit shift. In this arithmetic shift, all of the bits of the operand are shifted a given number of positions and the empty positions are filled in. In a preferred embodiment, the output of each butterfly during FFT is rounded. A butterfly is a portion of a DFT that breaks a single DFT into smaller DFTs or combines the results of smaller DFTs into a larger DFT. In a preferred embodiment, the butterfly consists of a multiply and addition. The output of each butterfly is rounded to limit the number of output bits to a reasonable amount.

In step 16 of FIG. 1, the LSB and the MSB are overlapped. Since the bits that are rounded off from the MSB FFT can have a large effect on the output, the MSB and the LSB are overlapped to reduce the distortion from rounding. That is, the MSBs and the LSBs are overlapped into the MSB FFT. Since the rounding errors will occur most significantly in the overlapped bits, these bits can be truncated off after the MSB FFT. As a result, the bits with the largest rounding error will be truncated off. The FFT is performed using the overlapping MSB and LSB inputs, as shown in steps 18 and 20. Any FFT algorithm known to those skilled in the art can be used to perform the FFT in steps 18 and 20.

In step 22, the output of the MSB FFT is right-shifted. This is necessary because the MSB input into the FFT was effectively left bit shifted in step 14. The method then sums the MSB and LSB FFTs in step 24 into a single stacked FFT result which is equal to the FFT of the initial waveform.

Figure 2:
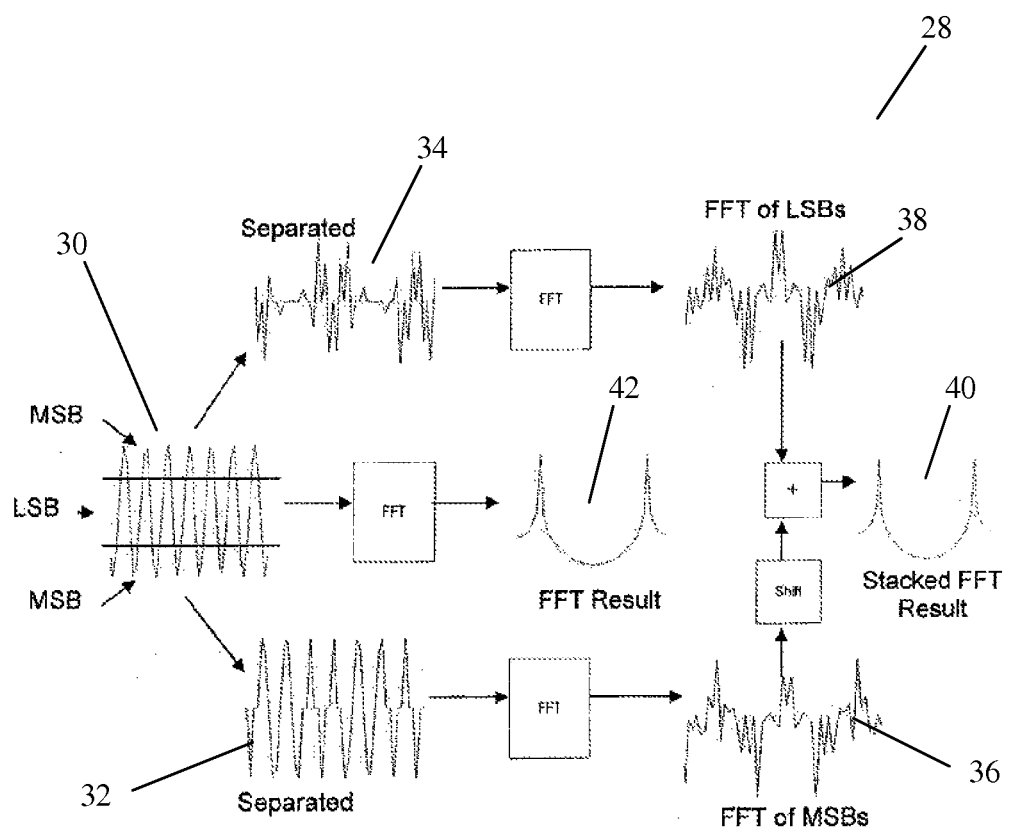
FIG. 2 is a schematic representation of the fast Fourier transform method according to one embodiment of the present invention.

FIG. 2 shows a schematic representation of a fast Fourier transform system 28 according to one embodiment. An initial waveform 30 is captured and optionally pre-processed by the system. Waveform 30 is comprised of MSBs and LSBs, which, through a left bit shift, are separated into an MSB waveform 32 and a LSB waveform 34. MSB waveform 32 and LSB waveform 34 are then separately FFTed by system 28 to produce MSB FFT output 36 and LSB FFT output 38. MSB FFT output 36 is then bit shifted to the right. Bit shifted MSB FFT outpute 36 and LSB FFT output 38 are then summed to produce the bit stacked FFT output 40. Bit stacked FFT output 40 is comparable to hypothetical output 42 in which the original waveform 30 was FFTed as a complete waveform. However, the production of output 40 has far fewer processing requirements compared to the production of hypothetical output 42.

Figure 3:
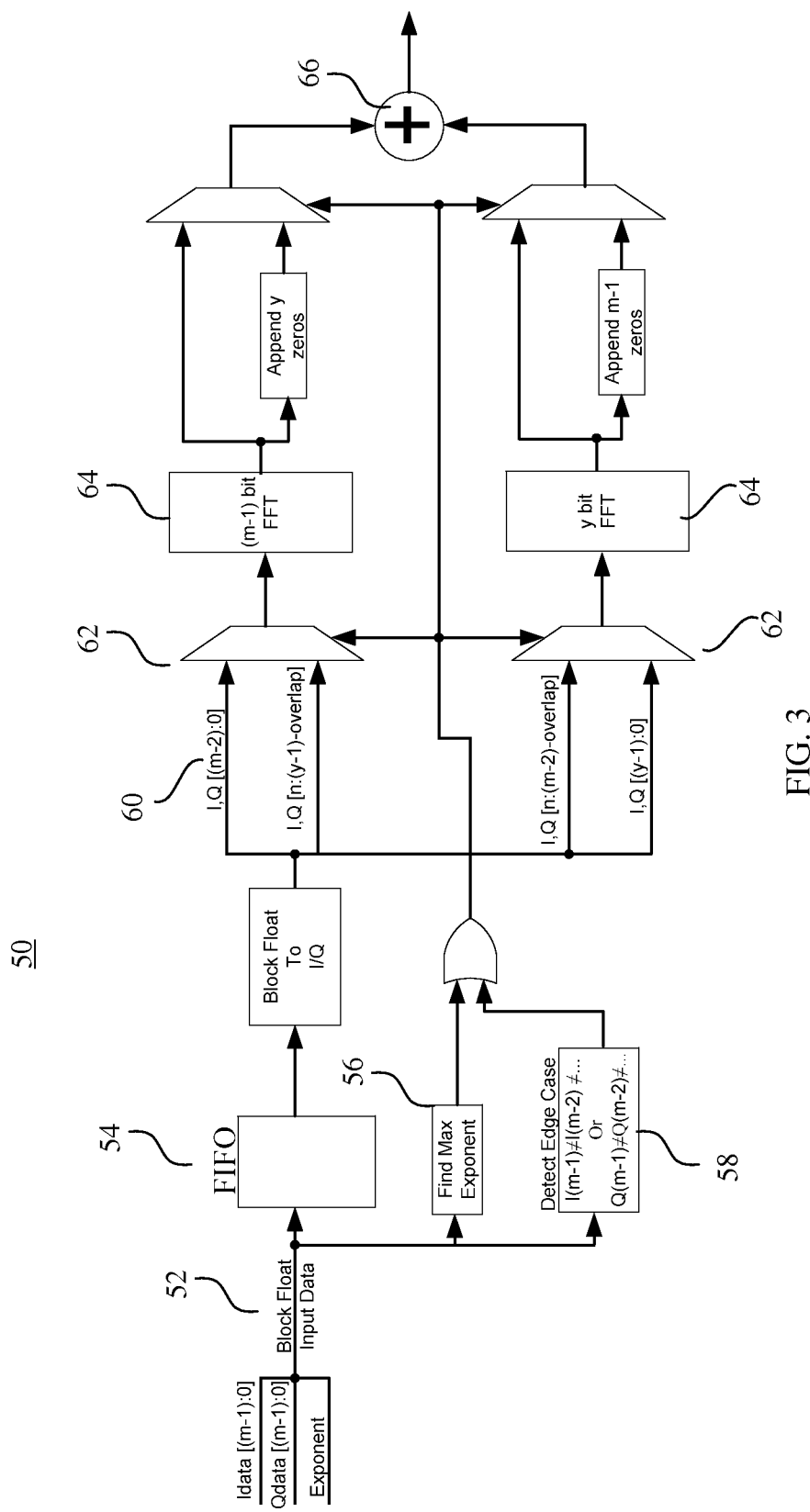
FIG. 3 is a schematic of the circuitry for bit stacked FFT method according to one embodiment of the present invention.

FIG. 3 shows a schematic of the circuitry 50 for the bit stacked FFT method according to one embodiment of the present invention. The block float input data 52, consisting of I data, Q data and an exponent, enters the system. The data enters a First In, First Out ("FIFO") component 54 to buffer and control the signal. The FIFO component can be any FIFO component known in the art, and will preferably contain storage and control logic components. The system determines the maximum exponent of the input signal at 56 and determines whether the input signal is in the edge case at 58. If so, the system changes the number of bits used in the LSB and MSB at 62 as described above. Then, at 60 the data is separated into the LSB and MSB via a bit shift and the LSB and MSB are overlapped. The FFT is performed at 64. The output of the MSB FFT is right-shifted and the MSB and LSB FFT outputs are summed into a single stacked FFT result at 66. The final output of the circuit can then be utilized in downstream applications.

Although the present invention has been described in connection with a preferred embodiment, it should be understood that modifications, alterations, and additions can be made to the invention without departing from the scope of the invention as defined by the claims.

What is claimed is:

1. A computer-implemented method for generating a fast fourier transform (FFT) comprising the steps of:
   a. receiving a signal data;
   b. storing the received signal data in a first memory storage device; and
   c. processing the stored signal data using a processor, said processing comprising the following steps:
   separating the stored signal data into a first partial signal comprising the least significant bits (LSB) of the stored signal data and a second partial signal comprising the most significant bits (MSB) of the stored signal data;
   performing FFT on said first and second partial signals to produce a first and second output;
   right bit shifting said second output; and
   summing the right bit shifted second output and said first output into a single bit stacked output.

2. The computer-implemented method of claim 1, wherein the step of separating the stored signal data comprises the substep of determining the magnitude of the received signal data.

3. The computer-implemented method of claim 2, wherein the step of separating the stored signal data further comprises the substep of adjusting the number of bits used in the LSB and the MSB if the magnitude of the received signal data is within a specified range.

4. The computer-implemented method of claim 1, wherein the stored signal data is separated into said first and second partial signals through division in the form of a bit shift.

5. The computer-implemented method of claim 1, wherein the output of each butterfly during FFT is rounded.

6. The computer-implemented method of claim 1, wherein said first and second partial signals are overlapped during the step of separating.

7. A system for generating a fast fourier transform ("FFT"), said system comprising:
- means for receiving a signal data;
- means for storing the received signal data in a first memory storage device;
- means for separating the stored signal data into a first partial signal comprising the least significant bits ("LSB") of the stored signal data and a second partial signal comprising the most significant bits ("MSB") of the stored signal data;
- means for performing FFT on said first and second partial signals to produce a first and second output;
- means for right bit shifting said second output; and
- means for summing the right bit shifted second output and said first output into a single bit stacked output.

8. The system of claim 7, wherein the system further comprises means for determining the magnitude of the received signal data.

9. The system of claim 8, wherein the system further comprises means for adjusting the number of bits used in the LSB and the MSB if the magnitude of the received signal data is within a specified range.

10. The system of claim 7, wherein the stored signal data is separated into said first and second partial signals through division in the form of a bit shift.

11. The system of claim 7, wherein the output of each butterfly during FFT is rounded.

12. The system of claim 7, further comprising means to overlap said first and second partial signals.

* * * * *

UNITED STATES PATENT AND TRADEMARK OFFICE
CERTIFICATE OF CORRECTION

| | | |
|---|---|---|
| PATENT NO. | : 8,516,027 B2 | |
| APPLICATION NO. | : 12/771278 | |
| DATED | : August 20, 2013 | |
| INVENTOR(S) | : Kristen L. Dobart et al. | |

It is certified that error appears in the above-identified patent and that said Letters Patent is hereby corrected as shown below:

In the Specification

Please enter the following section heading and paragraph before the BACKGROUND OF THE INVENTION section heading:

STATEMENT OF GOVERNMENT INTEREST

This work derives from research under Army Contract No. WI5P7T-07-C-P212. The U.S. Government has rights in this invention.

Signed and Sealed this
Tenth Day of September, 2013

Teresa Stanek Rea
*Acting Director of the United States Patent and Trademark Office*